United States Patent
Reich

(12) 
(10) Patent No.: US 6,276,564 B1
(45) Date of Patent: Aug. 21, 2001

(54) SORTING MAGAZINE FOR THE SUPPLY OF LOOSE SMALL PARTS

(75) Inventor: Holger Reich, Wuppertal (DE)

(73) Assignee: Stocko Fasteners GmbH, Wuppertal (DE)

( * ) Notice: Subject to any disclaimer, the term of this patent is extended or adjusted under 35 U.S.C. 154(b) by 0 days.

(21) Appl. No.: 09/481,788

(22) Filed: Jan. 12, 2000

(30) Foreign Application Priority Data

Jan. 15, 1999 (DE) .............................................. 199 01 439

(51) Int. Cl.$^7$ ...................................................... A01C 9/00
(52) U.S. Cl. .......................... 221/217; 221/219; 221/281; 406/52; 406/62
(58) Field of Search .................................. 221/217, 219, 221/281; 406/62, 52; 198/443

(56) References Cited

U.S. PATENT DOCUMENTS

| | | | |
|---|---|---|---|
| 951,412 | * | 3/1910 | Baltzer . |
| 3,308,774 | * | 3/1967 | Keeton . |
| 3,552,601 | * | 1/1971 | Hansen et al. . |
| 3,618,820 | * | 11/1971 | Keeton .................................. 221/219 |
| 3,638,829 | * | 2/1972 | Frase et al. .......................... 221/219 |
| 3,670,671 | * | 6/1972 | Lienemann et al. ................. 111/177 |
| 4,057,137 | * | 11/1977 | Hansen et al. ....................... 198/443 |
| 4,137,854 | * | 2/1979 | Lattin ..................................... 111/77 |
| 4,450,979 | * | 5/1984 | Deckler ................................ 221/263 |
| 4,664,290 | * | 5/1987 | Martin et al. . |
| 5,005,752 | | 4/1991 | Obst . |
| 5,325,801 | * | 7/1994 | Fiorido ................................. 111/185 |
| 5,377,867 | * | 1/1995 | Schick et al. . |
| 5,603,442 | | 2/1997 | Schmidt et al. . |
| 5,815,914 | | 10/1998 | Kamps et al. . |

FOREIGN PATENT DOCUMENTS

| | | |
|---|---|---|
| 196 49 417 A1 | 6/1998 | (DE) . |
| 841093 | 7/1960 | (GB) . |

* cited by examiner

*Primary Examiner*—Robert P. Olszewski
*Assistant Examiner*—Richard Ridley
(74) *Attorney, Agent, or Firm*—Friedrich Kueffner

(57) ABSTRACT

The sorting magazine serves for the supply of loose small parts (1) such as rivets, eyes, press fasteners and so forth. It includes a trough-shaped storage container (2) which has a front wall (3) and a magazine base plate (4), with a filling opening (5) for the small parts (1) and, in the base plate (4), an aperture (8) which adjoins an inclined bottom wall (9). The small parts can be guided by way of the aperture int ark adjoining rotary magazine comprising a drum-like rotary member (6) which is mounted rotatably about a substantially horizontal axis (7) and which serves for separating and orienting the small parts (1) for further processing thereof by machine. In order conveniently to provide for complete emptying, the magazine base plate (4) has a plate section (12) which is formed with the walls (3, 9) delimiting the storage container (2) to form a unit. That unit is movable from a closed operative position into an open position permitting the removal of all small parts, and vice-versa. It is preferably pivotable.

5 Claims, 5 Drawing Sheets

SORTING MAGAZINE FOR THE SUPPLY OF LOOSE SMALL PARTS

BACKGROUND OF THE INVENTION

1. Field of the Invention

The invention relates to a sorting magazine for the supply of loose small parts such as rivets, eyes, press fasteners and so forth, comprising a trough-shaped storage container which has a front wall and a magazine base plate and which has a filling opening for the small parts and in the base plate an aperture which adjoins an inclined bottom wall and by way of which the small parts can be guided into an adjoining rotary magazine comprising a drum-like rotary member which is mounted rotatably about a substantially horizontal axis and which serves for separating and aligning the small parts for further processing thereof by machine.

2. Description of the Related Art

In a known sorting magazine of this kind (DE 196 49 417 Al) the small parts pass through the aperture in the base plate into the operative region of the rotary magazine. It is not only the case that the subdivision of the storage container which is afforded in this sorting magazine by virtue of the presence of intermediate walls has a nuisance effect, but also, in the rotary magazine, in spite of the agitator elements which are provided therein, a situation involving mutual impediment comes about from time to time, together with a stoppage in the feed movement of the small parts into the passage with the adjoining conveyor shaft. Emptying the storage container, that is to say making an effort to remove the small parts, involves not inconsiderable difficulties in terms of reaching all small parts, in particular those which have already penetrated into the entry region to the passage.

SUMMARY OF THE INVENTION

The object of the present invention is to further develop the sorting magazine of the kind set forth in the opening part of this specification, in such a way that if necessary rapid and convenient emptying of the sorting magazine with the adjoining rotary magazine is made possible, by virtue of the removal of all small parts.

The sorting magazine according to the invention with which that object is attained is essentially distinguished in that the magazine base plate has a plate section which includes the aperture and which is formed with the walls defining the storage container to form a unit, and that said unit is movable from a closed operative position into an open position permitting the removal of all small parts, and vice-versa. That avoids the need for complicated endeavours in terms of also reaching the small parts which have remained separately at inaccessible locations.

The unit could be in the form of a separate magazine element and could be released and removed as a whole. It has proven to be particularly desirable however if the unit is pivotable from the operative position into the open position and vice-versa by way of a pivot axis provided in the edge region of the magazine base plate.

If, in the sorting magazine, the aperture adjoins the inclined bottom wall defining the storage container at its underside and is provided with a passage which is associated with the rotary magazine and passes the small parts in an oriented position for further processing thereof by machine, it has proven to be highly advantageous, in regard to the speedy removal of all small parts, if the lower boundary of the aperture of the plate section extends at a spacing from the lower boundary edge of the plate section of the magazine base plate, which in the closed operative position of the plate section covers over a small part-orientation region disposed upstream of the passage and in the open position ensures free removal even of the small parts which are disposed in that orientation region.

By virtue of the fact that, in a further advantageous configuration of the sorting magazine according to the invention, the lower boundary edge of the plate section extends at a spacing from the axis of the rotary member of the rotary magazine, which approximately corresponds to the diameter of the rotary member, free and convenient accessibility even to the last small parts in the rotary magazine and thus removal thereof are ensured, when the sorting magazine is put into the open condition.

In a further embodiment, it has proven to be highly advantageous in regard to free accessibility to the interior of the rotary magazine in the opened condition, if a plate region is cut out of the plate section of the magazine base plate, said plate region extending to over the central region of the container unit and being in the form of a mounting or bearing for the shaft carrying the rotary member of the rotary magazine.

The unit could be for example mounted pivotably by way of an axis in the upper edge region. However two hands would be required for operation of the assembly in the emptying operation. Therefore, an embodiment which has proven to be considerably more practical in comparison therewith is one in which the unit is pivotable in the edge region of the magazine base plate by way of a hinge about a lateral, approximately vertical pivot axis.

BRIEF DESCRIPTION OF THE DRAWING

Further details, features and advantages of the invention are apparent from the following description with reference to the accompanying drawing in which.

DESCRIPTION OF THE PREFERRED EMBODIMENTS

Figure 1:
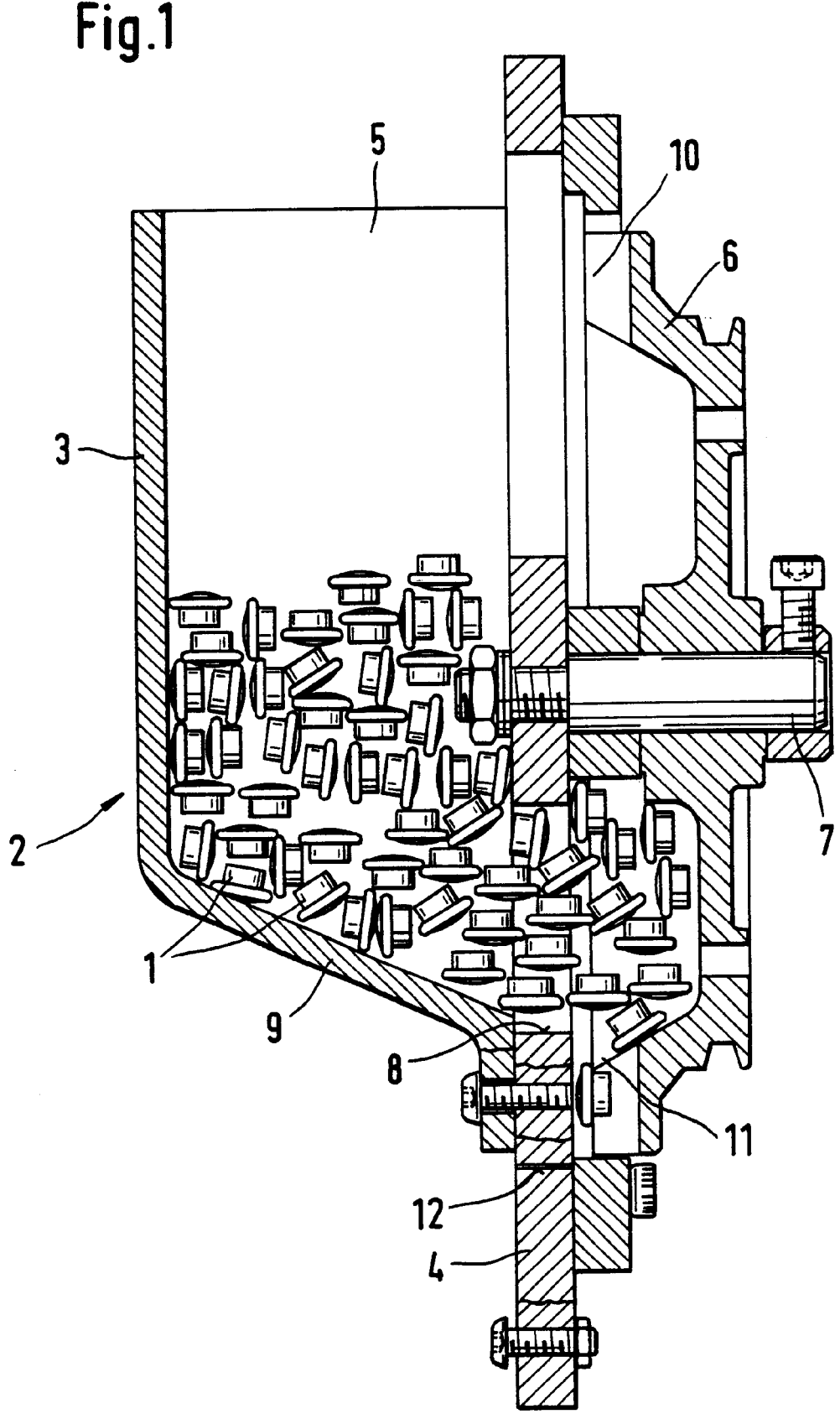
FIG. 1 is a view in axial section through the sorting magazine taken along line I—I in FIG. 2.

As can be seen from the drawing, the illustrated sorting magazine for the storage and supply of loose small parts 1 such as rivets, eyes, press fasteners and the like includes a trough-shaped storage container or bin 2 having a front wall 3 and a magazine base plate 4. The trough-shaped storage container 2 can be filled with the small parts 1 by way of a filling opening 5. Adjoining the magazine base plate 4 is a rotary magazine comprising a drum-like rotary member 6 which is rotatable about a substantially horizontal axis 7. The magazine base plate 4 is provided with an aperture 8, at which the small parts 1, being guided along an inclined bottom wall 9, pass into the region of the rotary member 6 with plates 10 acting as agitator elements. Disposed between the rotary member 6 and the magazine base plate 4 is an outlet opening 11 for the small parts 1 to a conveyor rail or track (not shown). The rotary member 6 and the conveyor rail or track serve in known manner for individually separating and orienting the small parts 1, for further processing thereof by machine.

Figure 2:
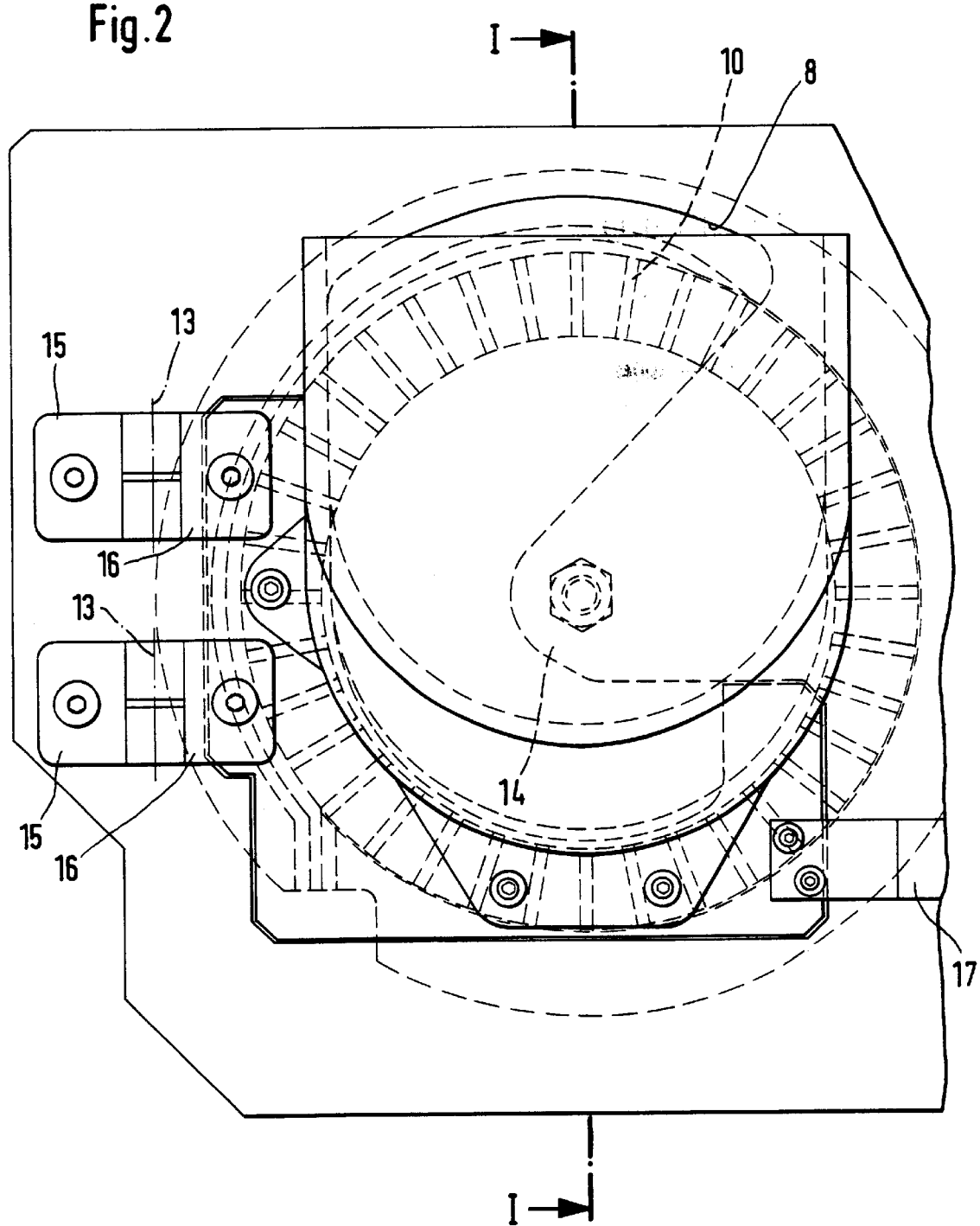
FIG. 2 is a front view of the sorting magazine in the closed condition.
Figure 3:
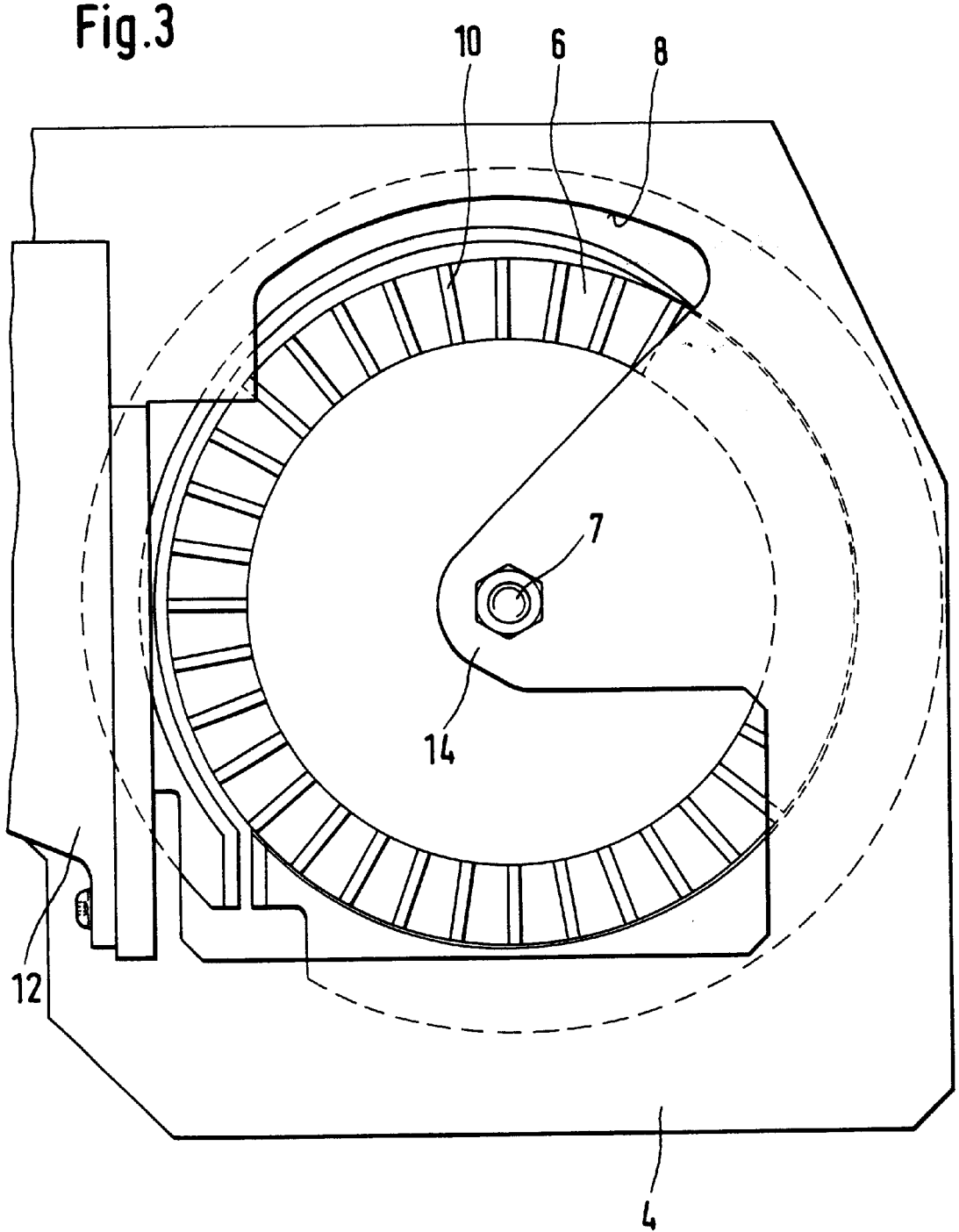
FIG. 3 is a front view of the sorting magazine in the open position.

As can be seen from the drawing, in particular FIGS. 2 and 3, the magazine base plate 4 has a plate section 12 which is formed with walls 3, 9 defining the storage container 2, to constitute a unit. That unit is movable from a closed operative position (FIGS. 2 and 4) into an open position (FIGS. 3 and 5), and vice-versa.

In a preferred embodiment, the above-mentioned unit is pivotable from the operative position into the open position and vice-versa by way of a vertical pivot axis 13 provided in the edge region of the magazine base plate 4.

In particular FIG. 1 clearly shows that the aperture 8 is provided in the lower region of the movable plate section 12 of the magazine base plate 4. In that way the aperture 8 adjoins the inclined bottom wall 9 delimiting the storage container 2 at its underside, and leads to the passage which is associated with the rotary magazine and which carries the small parts 1 in an oriented position for further processing thereof by machine. In this respect, the lower boundary of the aperture 8 in the plate section 12 extends at such a spacing from the lower boundary edge of the plate section of the magazine base plate 4 that, in the closed operative position of the plate section, a small part-orientation region which is disposed upstream of the passage and in which the outlet opening 11 for the small parts 1 is disposed is covered over, and that in the open position free removal even of the small parts in that orientation region is guaranteed. In this respect, it has proven to be particularly desirable if the lower boundary edge of the plate section 12 which in FIG. 1 is approximately at the end of the reference line of reference numeral 12 extends at a spacing from the axis of the rotary member 6 of the rotary magazine, which approximately corresponds to the diameter of the rotary member.

It can be particularly clearly seen from FIGS. 1 and 3 that cut-out of the plate section 12 of the magazine base plate 4 is a plate region 14 which extends to over the central region of the container unit and which is in the form of a mounting or bearing for the shaft 7 carrying the rotary member 6 of the rotary magazine. Upon pivotal movement of the unit about the pivot axis provided in the edge region of the magazine base plate 4 therefore the plate region 14 remains practically as a support arm for the shaft carrying the rotary member of the rotary magazine. Nonetheless in particular the region with the outlet opening 11 for the small parts, which adjoins the inclined bottom wall 9 of the storage container 2 and which is above the conveyor rail or track, is completely freely accessible so that all small parts can be conveniently removed. It has proven to be highly advantageous from the point of view of structure if the unit is pivotable in the edge region of the magazine base plate 4, by way of a hinge formed from the portions 15 and 16, about the lateral, approximately vertical pivot axis 13.

Figure 4:
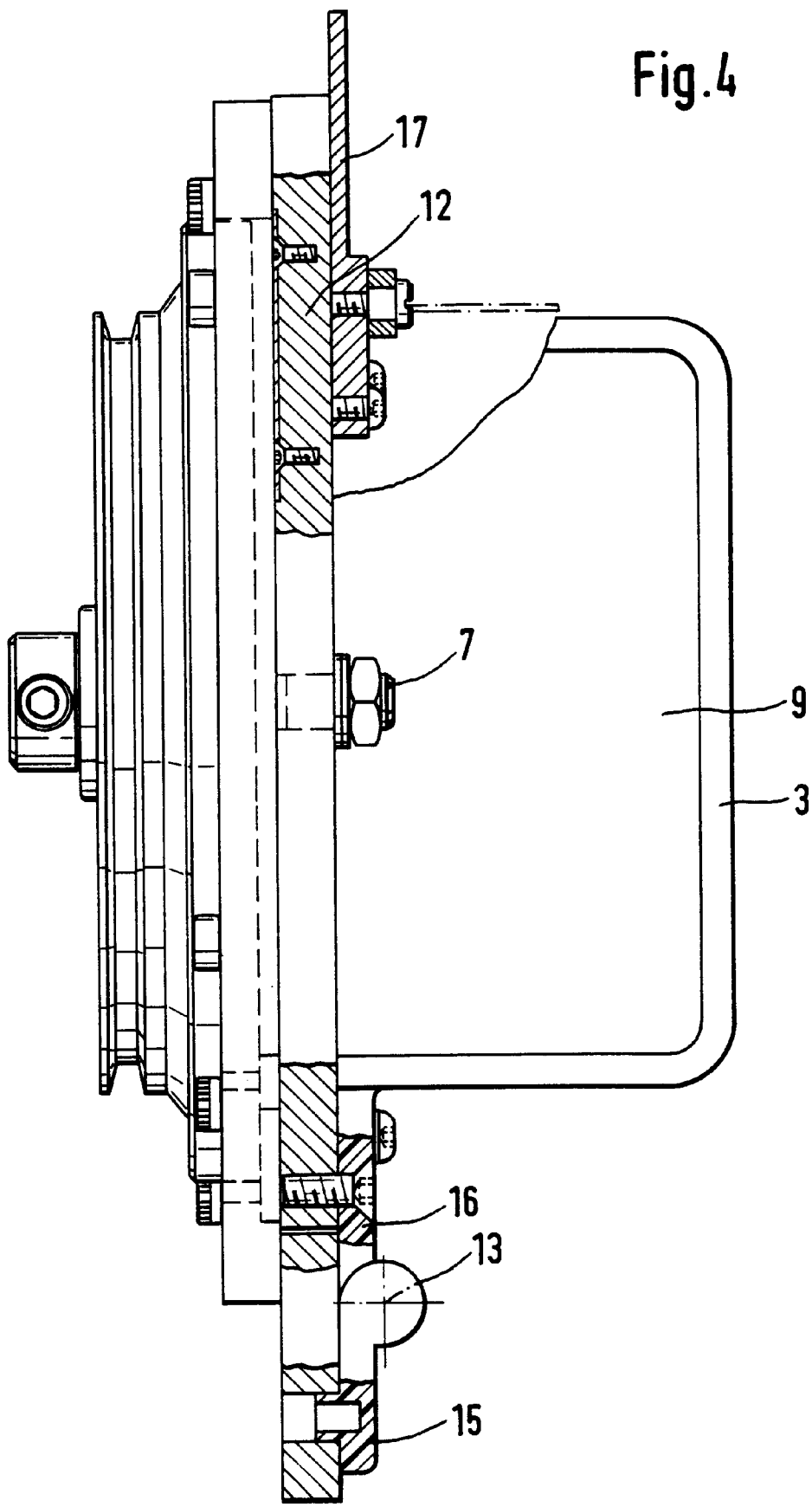
FIG. 4 is a plan view in partial section of the magazine in the closed operative position.
Figure 5:
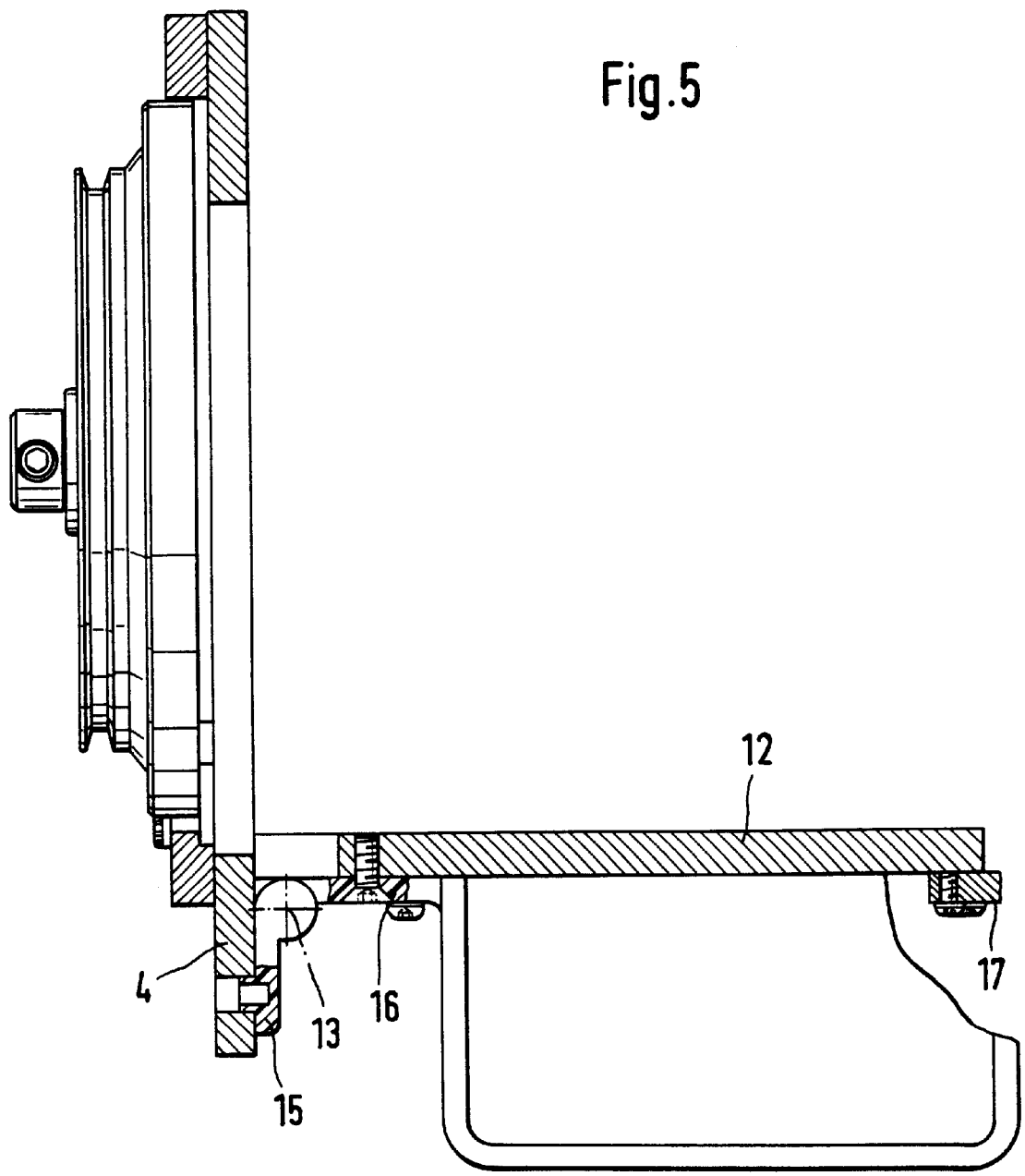
FIG. 5 is a plan view in partial section of the sorting magazine in the open position.

FIG. 4 shows that a handle 17 is fixed to the plate section 12 on the side of the storage container 2 that is remote from the pivot axis 13, in order to be able to pivot the plate section 12 comfortably into the open position and back again.

What is claimed is:

1. A sorting magazine for the supply of loose small parts, comprising a trough-shaped storage container which has a front wall and a magazine base plate and which has a filling opening for the small parts and in the base plate an aperture which adjoins an inclined bottom wall and by way of which the small parts can be guided into an adjoining rotary magazine comprising a drum-like rotary member which is mounted rotatably about a substantially horizontal axis and which serves for separating and orienting the small parts for further processing thereof by machine, wherein the magazine base plate has a plate section which is formed with the walls defining the storage container to form a unit, and wherein said unit is movable from a closed operative position into an open position permitting the removal of all small parts, and vice-versa, and wherein the aperture adjoins the inclined bottom wall delimiting the storage container at its underside, and with a passage which is associated with the rotary magazine and which passes the small parts in an oriented position for further processing thereof by machine, wherein the lower boundary of the aperture of the plate section extends at a spacing from the lower boundary edge of the plate section of the magazine base plate, which in the closed operative position of the plate section covers over a small part-orientation region disposed upstream of the passage, and in the open position guarantees free removal even of the small parts disposed in said orientation region, wherein cut out of the plate section of the magazine base plate is a plate region which extends to over the central region of the container unit and which is formed as a mounting for the shaft carrying the rotary member of the rotary magazine.

2. A sorting magazine according to claim 1, wherein the unit is pivotable from the operative position into the open position and vice-versa by way of a pivot axis provided in the edge region of the magazine base plate.

3. A sorting magazine according to claim 1, wherein the movable plate section includes the aperture.

4. A sorting magazine according to claim 3, wherein the lower boundary edge of the plate section extends at a spacing from the axis of the rotary member of the rotary magazine, which approximately corresponds to the diameter of the rotary member.

5. A sorting magazine according to claim 2, wherein the unit is pivotable in the edge region of the magazine base plate by way of a hinge about a lateral, approximately vertical pivot axis.

* * * * *